Patented Dec. 1, 1936

2,062,907

UNITED STATES PATENT OFFICE 2,062,907

METHOD OF MAKING AND USING A GLASS BATCH

Benjamin A. Jeffery and Frank H. Riddle, Detroit, Mich., assignors to Champion Spark Plug Company, Toledo, Ohio, a corporation of Delaware No Drawing. Application May 26, 1933, Serial No. 673,024

6 Claims. (Cl. 49—77)

This invention relates to a glass batch and a method of making and using the same. More specifically it relates to a batch prepared in pellets of substantially uniform composition and a method of forming the pellets and employing the batch produced thereby.

The ordinary glass batch is formed of a plurality of ingredients having different compositions, different specific gravities, and usually different grain sizes. As a result it is difficult to prevent segregation of the different ingredients of the batch. As a result of the segregation which is almost inevitable, the somewhat varying composition of the batch leaves relatively more flux in certain portions than in others, resulting in a difference in the temperature required for melting and differences in the composition of different portions of the glass. This requires higher melting temperatures than would otherwise be necessary, since the temperature must be high enough to melt the most resistant portions of the somewhat segregated batch. Also it requires a longer time to melt the batch and a more prolonged period in the molten state before the glass becomes uniform and refined so as to be ready for working into articles.

The improvement which constitutes this invention together with its advantages will become apparent as the description proceeds.

The usual practice has been to incompletely mix the different, previously coarse ground, ingredients of the batch and charge this mixture into the furnace. In following our improved method, the materials are "batch ground" to about 100 mesh and finer. This may be done dry, but wet grinding is more satisfactory, since it is desired to mix the materials with water to form slip. This slip, or water suspension, may be of about the same consistency as the slip used in casting pottery bodies. Certain electrolytes may be used to control the viscosity of the slip, if desired, in accordance with methods known to experts in ceramic slips. This slip is then sprayed and dried in a suitable spray drying apparatus, preferably so as to form rounded pellets. The nature and size of the pellets are dependent upon the composition of the glass batch, the fineness of grinding, the manner in which the spray is formed, and the drying procedure. These various elements may be regulated to obtain the desired results. For most purposes it is preferable to regulate the various processes so as to form small rounded pellets. When treated in this manner, these pellets constitute a batch which is substantially uniform in consistency and, since each pellet is of substantially the same composition as other pellets, there is little tendency towards segregation. Consequently the batch may be handled as desired and remain substantially uniform throughout.

It will be understood that the soluble material of the batch which is dissolved in the slip will be uniformly distributed throughout, and will constitute substantially the same proportion of each sprayed drop, and accordingly of the resulting dried pellet. Due to the drying process, the composition of an individual pellet may vary somewhat from core to surface, the soluble materials being in greater proportion at the surface, but the pellets are so minute that any such variation is not objectionable.

The permanent uniformity of the batch is specially important for making colored, opaque, translucent or opalescent glass where uniform appearance of the product is desirable but difficult to obtain.

The pellets may be pressed into briquets or may be fed to the melting receptacle in any usual manner, but preferably they are introduced into the tank or added to the pot in a controlled stream of pellets. The nature of the material when spray dried, as described, makes it possible to introduce a substantially constant stream of batch material of exactly regulated size so that the material may be introduced continuously or intermittently, and in either case at exactly the rate desired.

Furthermore, a batch prepared in this manner does not contain any extremely fine particles which are readily carried away by the furnace gases. Also the flux remains uniformly distributed throughout the batch and also in very intimate contact with the other ingredients of the batch. As a consequence the melting takes place uniformly and the resulting chemical reactions are promptly and uniformly effected and the resulting molten material is consequently of a high degree of uniformity and can be more promptly refined to a proper working condition. Where, as recommended, the grinding has been somewhat finer than is customary, the melting may be effected at a somewhat lower temperature than is customary with the same composition of glass batch. This results from the finer grinding of the material, the uniform and intimate mixture of the flux with the other ingredients so that there is no portion of the batch that requires a materially higher temperature than other portions of the batch to bring it to the melting point, and to the fact that pellets do not pack together in lumps as is likely to happen with the ordinary batch. Batch pellets formed in this manner permit the ready passage of heated gases through a mass thereof before fusion, and, when dropped onto molten glass in a mass, the rounded pellets run out and spread over a larger surface and are more readily surrounded by molten glass and incorporated therewith than materials in the usual batch form. It will be readily seen that this uniform and prompt melting may be facilitated by feeding the pellets to the melting chamber in such a way that they are showered out through the hot gases above the glass and settle on the surface of the glass as separated pellets rather than as masses of batch. This is made possible by the pellet formation which substantially eliminates dust that would be carried off by the furnace gases and constitutes a material which can be spread out in this manner in a regulable shower.

If desired, the pellets may be dropped down through a stack up which heated gases are passed, and thus the pellets may be heated to any desired degree before reaching the molten glass pool or layer. If convenient, the slip may be dried by waste gases from the glass furnace, or from the preheating stack just mentioned, if that is employed. Under some circumstances, the preheating may be carried to such a degree as to materially reduce the frothing that usually accompanies the melting of a glass batch.

For the ordinary glass composition, no special preparation, other than the mentioned preferable fine grinding, is necessary for forming a slip which may be readily spray dried into pellets, but, if necessary to obtain the proper consistency of the slip, some or all of the batch may be run through a colloid mill.

While special ways may be developed for using the described glass batch to advantage, which would not be available for the batch as now commonly prepared, the chief advantage which is claimed for this glass batch is the greater facility with which it may be handled in the usual glass melting methods, the reduction in temperature and in melting and refining time made possible by this form of glass batch, the high degree of uniformity of the resulting glass, and the ease and accuracy with which the exact composition of the resulting glass can be controlled.

The qualities of the improved batch make possible a greater production with a furnace of given size, or the use of a smaller furnace, as both the melting and refining times are shortened, thus effecting material savings in heat and expense of equipment.

Another item affecting both the cost of equipment and the quality of the product is the lessened corrosion of the walls of the molten glass container. There are ingredients in the batch that are more corrosive of the container walls than is the final molten glass. Therefore the uniform mixture of the batch and the quick melting greatly reduces the exposure of the container walls to the melting glass in its raw and most corrosive condition. This is an obvious benefit in saving equipment, and likewise aids in producing good and uniform glass, as it reduces the contamination of the glass by the corroded ingredients of the container walls, enabling the glass maker to more nearly determine in advance the final composition of his glass both as to kinds and proportions of ingredients.

Another item in connection with this ease and accuracy of control of the composition is the reduction in the loss of chemicals due to volatilization during the melting process. The volatilization is reduced because of the possibility of reducing the melting temperature, as described above, and because the ingredients which will readily volatilize are so intimately and uniformly mixed with the other ingredients that chemical reaction takes place promptly and equilibrium is reached. The loss by volatilization is detrimental not only because of the waste of materials, which are usually the more expensive ingredients in the batch, but also because the amount of loss is hard to calculate and varies with different portions of the same charge of the same batch, because of the differences in size and composition of different portions of the charge.

In the appended claims where substantially uniform pellets are specified, it will be understood that the size of the individual pellets may vary somewhat as is customary in the product of spray drying, but that the term is intended to distinguish from a mass which has relatively large lumps therein or fine powder, and to require the material to be all in the small pellet form.

What is claimed is:—

1. The method of forming a glass batch, which consists in forming a slip from glass making materials, mixing the materials uniformly throughout the slip, and spray drying the slip into pellets.

2. A method in accordance with claim 1, and in which the materials are ground to 100 mesh and finer.

3. A method in accordance with claim 1, and in which the slip formation and spray drying is regulated to produce approximately uniform pellets of approximately spherical form.

4. A method of producing glass from glass forming materials, which consists in forming the materials into a slip, spray drying the slip into pellets, showering the pellets onto the surface of a pool of molten glass and melting the pellets into said pool.

5. A method of producing glass from glass forming materials, which consists in forming the materials into a slip, spray-drying the slip into pellets, showering the pellets downward through rising heating gas, and melting the pellets to form glass.

6. In a method in accordance with claim 5, passing said heating gas through the sprayed slip for drying the same.

BENJAMIN A. JEFFERY.
FRANK H. RIDDLE.